(12) United States Patent
Saka et al.

(10) Patent No.: US 6,788,817 B1
(45) Date of Patent: Sep. 7, 2004

(54) OBJECT RECOGNITION SYSTEM

(75) Inventors: Masakazu Saka, Wako (JP); Hiromitsu Yuhara, Wako (JP); Tomoyoshi Aoki, Wako (JP); Morimichi Nishigaki, Wako (JP)

(73) Assignee: Honda Giken Kogyo Kabushikikaisha (JP)

( * ) Notice: Subject to any disclaimer, the term of this patent is extended or adjusted under 35 U.S.C. 154(b) by 624 days.

(21) Appl. No.: 09/691,545

(22) Filed: Oct. 18, 2000

(30) Foreign Application Priority Data

Nov. 4, 1999 (JP) .......................................... 11-314330

(51) Int. Cl.⁷ ................................................. G06K 9/48
(52) U.S. Cl. ....................... 382/199; 382/190; 382/291
(58) Field of Search ................................ 382/103–104, 382/106, 181, 190, 199, 291; 340/903, 933, 937; 348/169

(56) References Cited

U.S. PATENT DOCUMENTS

| | | | | |
|---|---|---|---|---|
| 5,487,116 A | * | 1/1996 | Nakano et al. .............. | 382/104 |
| 5,617,085 A | * | 4/1997 | Tsutsumi et al. ........... | 340/903 |
| 5,892,855 A | * | 4/1999 | Kakinami et al. .......... | 382/291 |
| 5,987,174 A | * | 11/1999 | Nakamura et al. .......... | 382/199 |
| 6,005,492 A | * | 12/1999 | Tamura et al. .............. | 340/937 |
| 6,191,704 B1 | * | 2/2001 | Takenaga et al. ........... | 340/903 |

FOREIGN PATENT DOCUMENTS

| | | |
|---|---|---|
| JP | 9-16782 | 1/1997 |
| JP | 10-97699 | 4/1998 |

OTHER PUBLICATIONS

Bennamoun, et al. "A structural–description–based vision system for automatic object recognition", IEEE, pp. 893–906, 1997.*

* cited by examiner

*Primary Examiner*—Daniel Mariam
(74) *Attorney, Agent, or Firm*—Lahive & Cockfield, LLP; Anthony A. Laurentano, Esq.

(57) ABSTRACT

An object recognition system including a position sensor, an image sensor and a controller is provided. The position sensor determines the position of an object, and the image sensor captures an image of the object. The controller sets a processing area within the image captured by the image sensor based on the position of the object determined by the position sensor and a predetermined size for the object to be recognized. The controller extracts horizontal edges from the processing area, and identifies horizontal edges belonging to the outline of the object from the extracted edges. Thus, the object can be recognized based on the horizontal edges only. Similarly, the controller can extract vertical edges from the processing area and identify vertical edges belonging to the outline of the object. Preferably, the controller selects upper, lower, left, and right horizontal and vertical candidate ends of the object from the identified horizontal and vertical edges respectively, from which upper, lower, left, and right ends of the object are determined. If either one or both of the left and right horizontal candidate ends cannot be selected, candidate ends can be estimated based on the position of the object recognized in a previous recognition cycle, and the estimated candidate ends can be used in lieu of the candidate ends selected from the horizontal edges.

11 Claims, 17 Drawing Sheets

Fig. 7

| -1 | -1 | -1 |
|----|----|----|
| 2  | 2  | 2  |
| -1 | -1 | -1 |

(a)

$F(i j) =$

| F(-1,-1) | F(0,1-1) | F(1,-1) |
|----------|----------|---------|
| F(-1,0)  | F(0,0)   | F(1,0)  |
| F(-1,1)  | F(0,+1)  | F(1,1)  |

(b)

Fig. 9
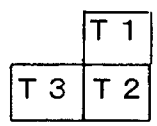
(a)
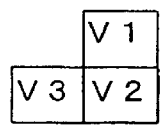
(b)
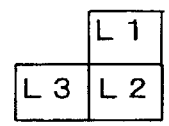
(c)
(d)
| | Conditions | Results | |
|---|---|---|---|
| | | Label L2 | Combined Labels |
| 1 | V1≠V2, V3≠V2 | L | |
| 2 | V1≠V2, V3=V2 | L3 | |
| 3 | V1=V2, V3≠V2 | L1 | |
| 4 | V1=V2, V3=V2, L1=L3 | L1 | |
| 5 | V1=V2, V3=V2, L1≠L3 | L1 | (L1, L3) |
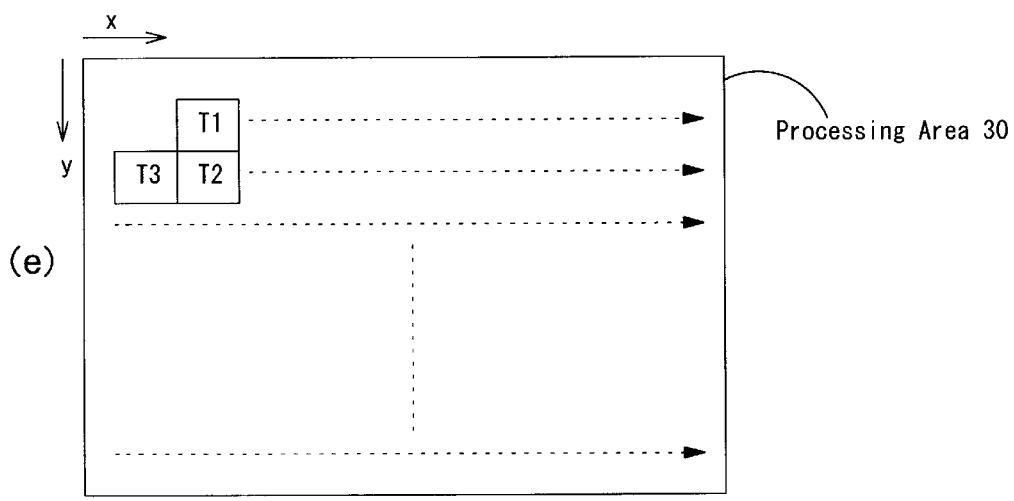
(e)

Fig. 10

|   |   |   |   |   |   |   |   |   |   |   |   |   |
|---|---|---|---|---|---|---|---|---|---|---|---|---|
| . | . | . | . | . | . | . | . | . | . | . | . | . |
| . | 1 | 1 | . | . | . | 1 | 1 | . | . | . | . | . |
| . | 1 | . | . | . | . | . | 1 | 1 | . | . | . | . |
| . | . | . | 1 | . | . | . | . | 1 | 1 | 1 | 1 | . |
| . | . | 1 | 1 | 1 | 1 | 1 | . | . | . | . | . | . |
| . | 1 | 1 | . | . | . | 1 | 1 | . | . | . | . | . |
| . | 1 | 1 | . | . | . | 1 | 1 | . | . | . | . | . |

(a)

|   |   |   |   |   |   |   |   |   |   |   |   |   |
|---|---|---|---|---|---|---|---|---|---|---|---|---|
| . | . | . | . | . | . | . | . | . | . | . | . | . |
| . | A | A | . | . | . | B | B | . | . | . | . | . |
| . | A | . | . | . | . | . | B | B | . | . | . | . |
| . | . | . | C | . | . | . | . | B | B | B | B | . |
| . | . | D | C | C | C | C | . | . | . | . | . | . |
| . | E | D | . | . | . | C | C | . | . | . | . | . |
| . | E | D | . | . | . | C | C | . | . | . | . | . |

93  92  91   (b)

|   |   |   |   |   |   |   |   |   |   |   |   |   |
|---|---|---|---|---|---|---|---|---|---|---|---|---|
| . | . | . | . | . | . | . | . | . | . | . | . | . |
| . | A | A | . | . | . | B | B | . | . | . | . | . |
| . | A | . | . | . | . | . | B | B | . | . | . | . |
| . | . | . | C | . | . | . | . | B | B | B | B | . |
| . | . | C | C | C | C | C | . | . | . | . | . | . |
| . | C | C | . | . | . | C | C | . | . | . | . | . |
| . | C | C | . | . | . | C | C | . | . | . | . | . |

| -1 | 2 | -1 |
|----|---|----|
| -1 | 2 | -1 |
| -1 | 2 | -1 |

Fig. 12
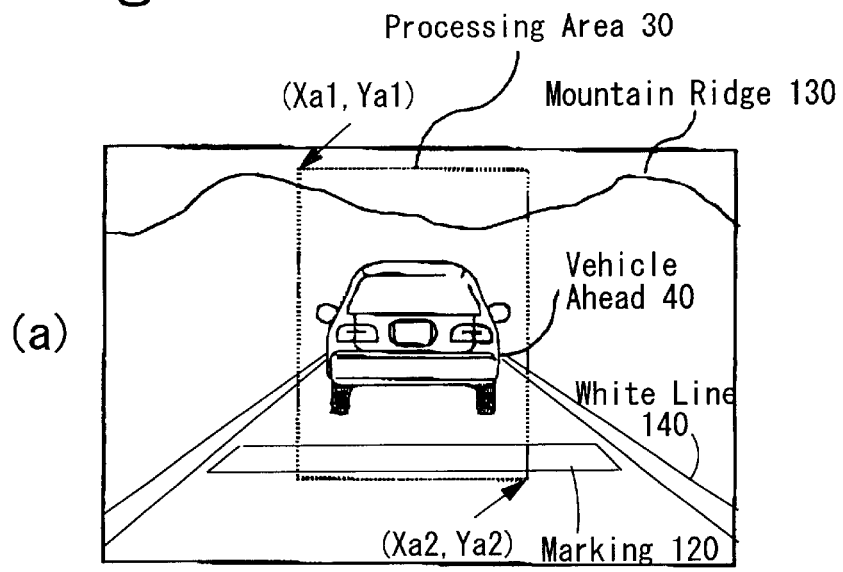
(a)
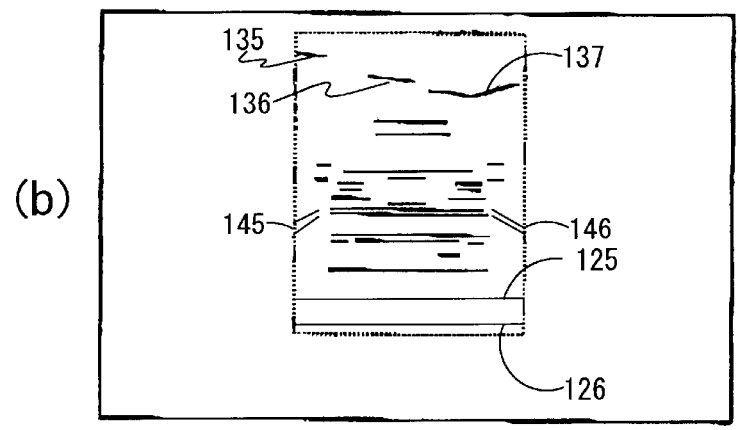
(b)
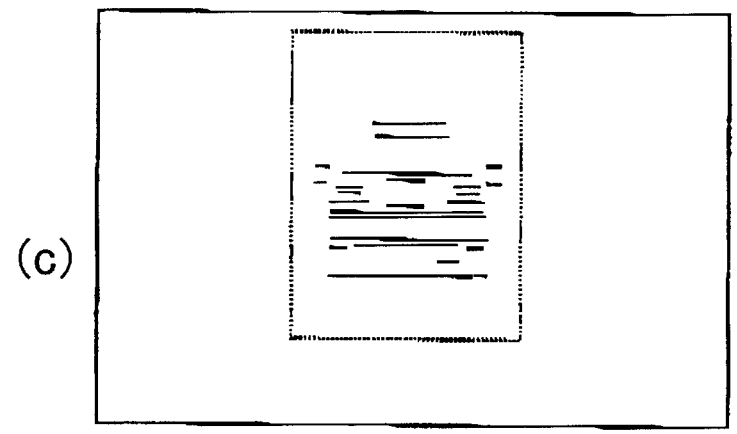
(c)

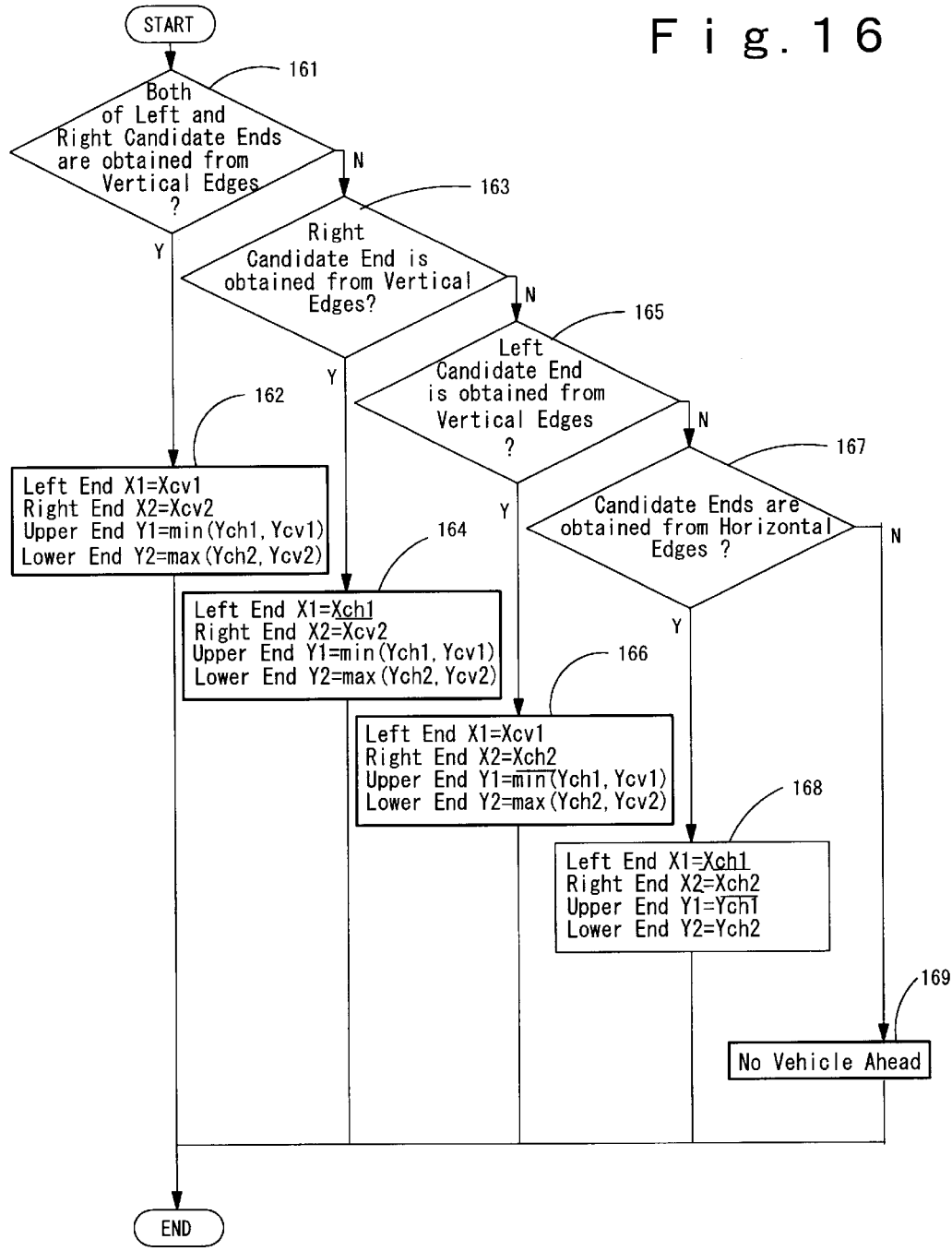

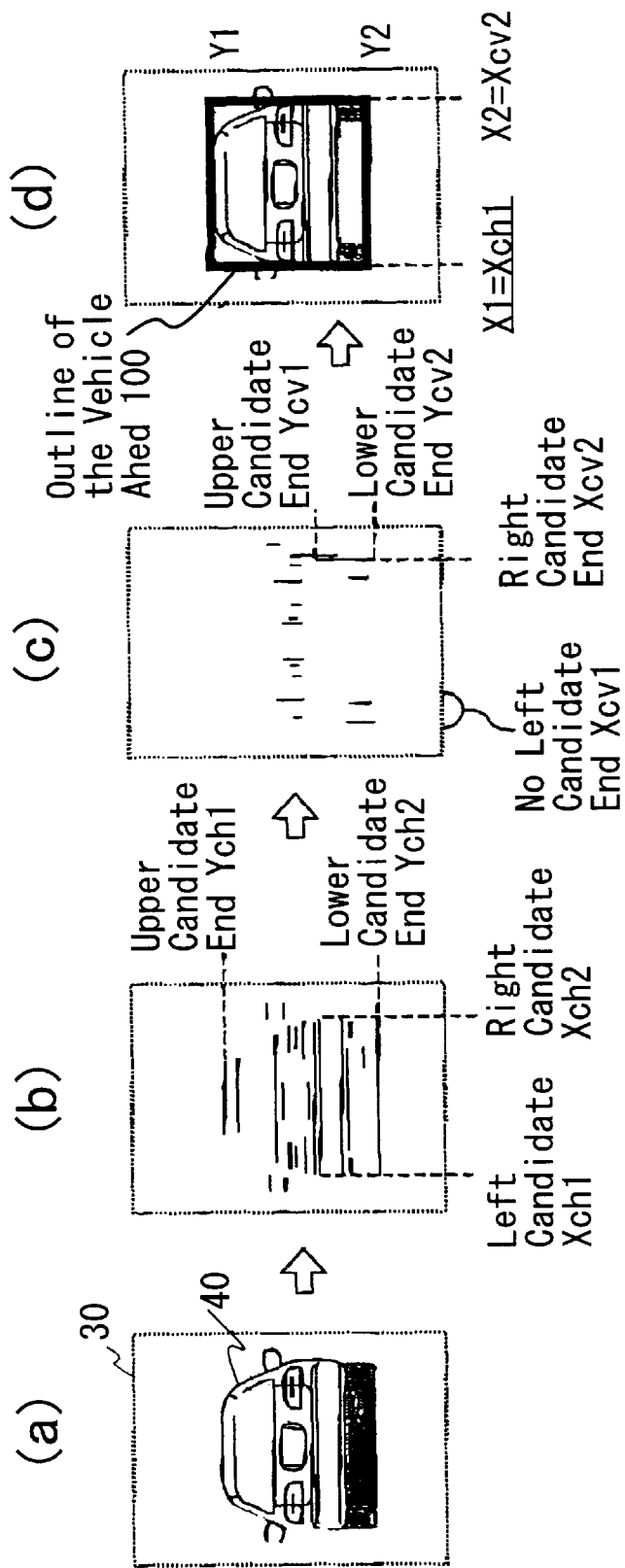

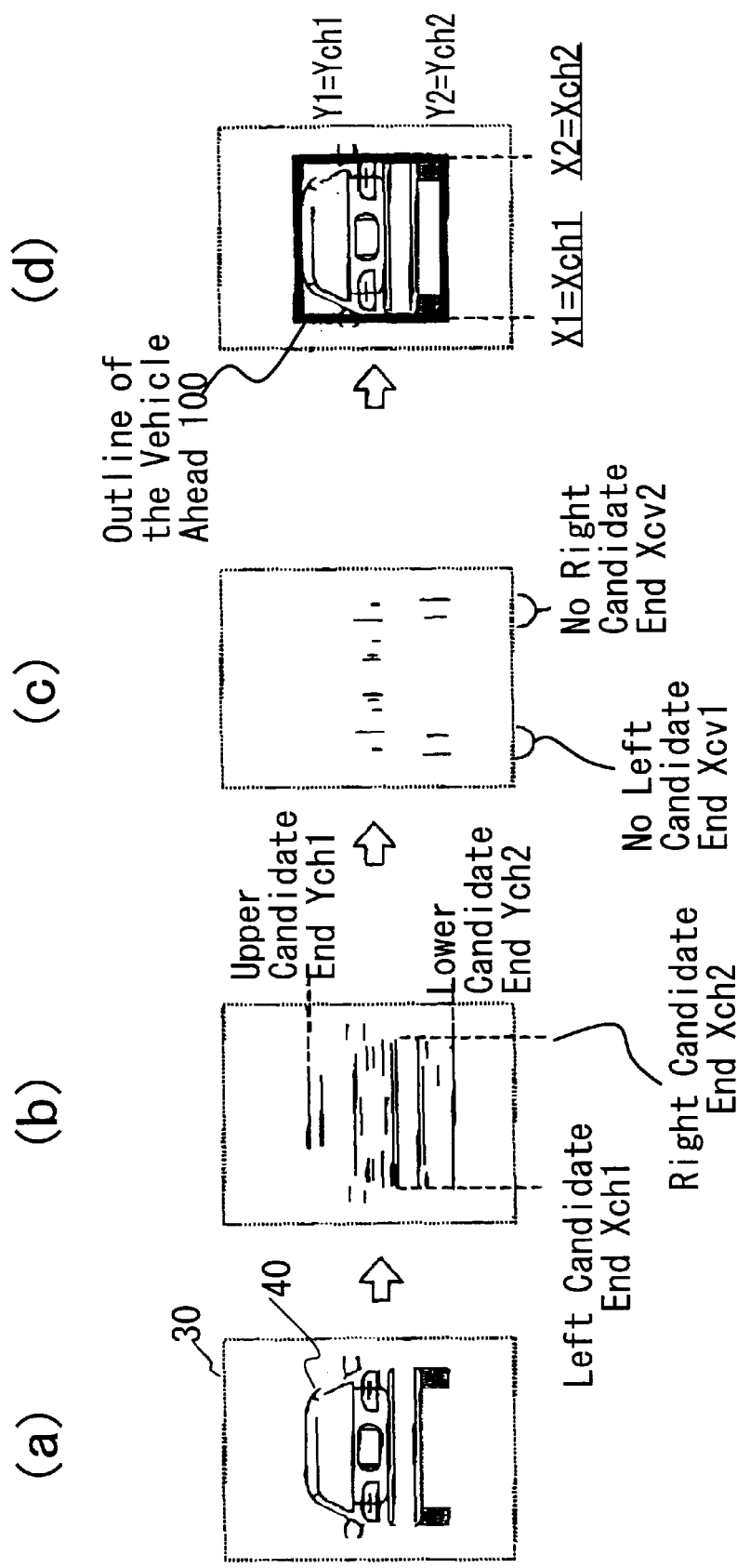

OBJECT RECOGNITION SYSTEM

FIELD OF THE INVENTION

The present invention relates to an object recognition system which is mounted on a vehicle and recognizes an object ahead of the vehicle, and more particularly to an object recognition system which is mounted on a vehicle and recognizes the outline of an object ahead of the vehicle.

BACKGROUND OF THE INVENTION

In recent years, devices which determine the distance and size of objects in front of a vehicle, and which appropriately control the vehicle in accordance with this determination, have been proposed for improving the safety of vehicle operation. A typical method for obtaining information about an object ahead includes the steps of: extracting horizontal edges and vertical edges from a captured image; determining whether each of the extracted edges belongs to the object such as a vehicle ahead; and recognizing the object based on the edges determined to belong to the object.

Japanese Patent Application Kokai No. Hei 10-97699 describes a device for determining whether or not an object exists. The device recognizes left and right guidelines such as white lines in a captured image, and extracts horizontal edges from an area between the left and right guidelines. A probable area in which an obstacle may exist is estimated based on the extracted horizontal edges. Vertical edges are then extracted in the probable area. The device judges that no object exists if the number of vertical edges whose lengths exceed a predetermined value is less than two.

Japanese Patent Application Kokai No. Hei 9-16782 describes a device for determining whether or not an object exists. According to the device, a captured image is divided into a plurality of small areas. An area containing detected vertical edge points is defined as a vertical edge area, and an area containing detected horizontal edge points is defined as a horizontal edge area. Intersections of a group of continuous vertical edge areas and a group of continuous horizontal edge areas are determined. If four or more intersections are detected and they form a rectangle, then the rectangle is recognized as the object.

However, according to Japanese Patent Application Kokai No. Hei 10-97699, if the color of a part of an object is similar to, and therefore has not a sufficient contrast to the color of the background, and two or more vertical edges cannot be obtained in the probable area, then the recognition error may take place that 'no object' exists even if there is actually an object. According to Japanese Patent Application Kokai No. Hei 9-16782, if four or more intersections of vertical edges and horizontal edges cannot be obtained because of an insufficient contract, then the recognition error may take place that 'no object' exists even if there is actually an object.

Accordingly, one object of the invention is to provide a system capable of recognizing the outline of an object from horizontal edges and/or vertical edges even if desired horizontal edges or vertical edges cannot be obtained.

SUMMARY OF THE INVENTION

According to one aspect of the invention, an object recognition system including a position sensor, an image sensor, and a controller is provided. The position sensor determines the position of an object, and the image sensor captures an image of the object. The position sensor can be implemented with radar or a pair of image sensors. The controller sets a processing area within the image captured by the image sensor based on the position of the object determined by the position sensor and a predetermined size for the object to be recognized. It is preferable that the predetermined size is set to surround the object to be recognized.

The controller extracts horizontal edges from the processing area. Extraction of edges can be carried out by detecting a variation of intensity values of pixels contained in the processing area. The controller then identifies horizontal edges indicating or belonging to the outline of the object from the extracted horizontal edges. Thus, the object can be recognized based on the horizontal edges only. Similarly, the controller can extract vertical edges from the processing area, and identify vertical edges belonging to the outline of the object.

According to one aspect of the invention, the outline of the object is recognized by determining upper, lower, left, and right ends of the object. Thus, the vehicle ahead traveling in front of the vehicle mounting the system of the invention is recognized by the positions of the upper, lower, left, and right ends of the outline of the vehicle ahead.

According to one aspect of the invention, the controller selects upper, lower, left, and right candidate ends from the identified horizontal edges, and selects upper, lower, left, and right candidate ends from the identified vertical edges. The controller then determines the upper, lower, left, and right ends of the object based on the upper, lower, left, and right candidate ends selected from the horizontal edges and the upper, lower, left, and right candidate ends selected from the vertical edges.

Preferably, the left and right candidate ends selected from the vertical edges are chosen as the left and right ends of the object respectively. For the upper end of the object, the higher one of the upper candidate end selected from the horizontal edges and the upper candidate end selected from the vertical edges is chosen as the upper end of the object. For the lower end of the object, the lower one of the lower candidate end selected from the horizontal edges and the lower candidate end selected from the vertical edges is chosen as the lower end of the object.

According to one aspect of the invention, if either one or both of the left and right candidate ends cannot be selected from the vertical edges, then the left or right end of the object is determined by the left or right candidate end selected from the horizontal edges in lieu of the left or right candidate end selected from the vertical edges.

According to another aspect of the invention, if either one or both of the left and right candidate ends cannot be selected from the horizontal edges, then the left and right ends of the object are determined by estimated left and right candidate ends in lieu of the left and right candidate ends selected from the horizontal edges. The estimated left and right candidate ends can be determined based on the position of the object recognized in a previous recognition cycle.

The controller can comprise a micro-controller which typically includes a central unit (CPU), or a micro-processor, a read-only memory (ROM) containing control programs that when executed by the processor performs respective functions which are to be described hereafter. The controller also includes a random-access memory (RAM) that provides a working area for the CPU and temporary storage for various data and programs.

BRIEF DESCRIPTION OF THE DRAWINGS

FIG. 7 (A) is a diagram showing the filter for extracting horizontal edges, and FIG. 7(B) is a diagram showing the coordinates of filter elements.

FIGS. 9 is a diagram illustrating the template and method of determining labels used in accordance with one embodiment of the present invention.

FIG. 10 is a diagram illustrating labeling scheme in accordance with one embodiment of the present invention.

FIG. 11 is a diagram showing the filter for vertical edges.

FIG. 12 is a diagram showing the scheme for determining horizontal edges in accordance with one embodiment of the present invention.

FIG. 16 is a flowchart of the method for recognizing the outline of the object in accordance with one embodiment of the present invention.

FIG. 17 is a diagram showing the case in which the left vertical candidate end cannot be selected.

FIG. 18 is a diagram showing the case in which the left and right vertical candidate ends cannot be selected.

DESCRIPTION OF THE PREFERRED EMBODIMENTS

Figure 1:
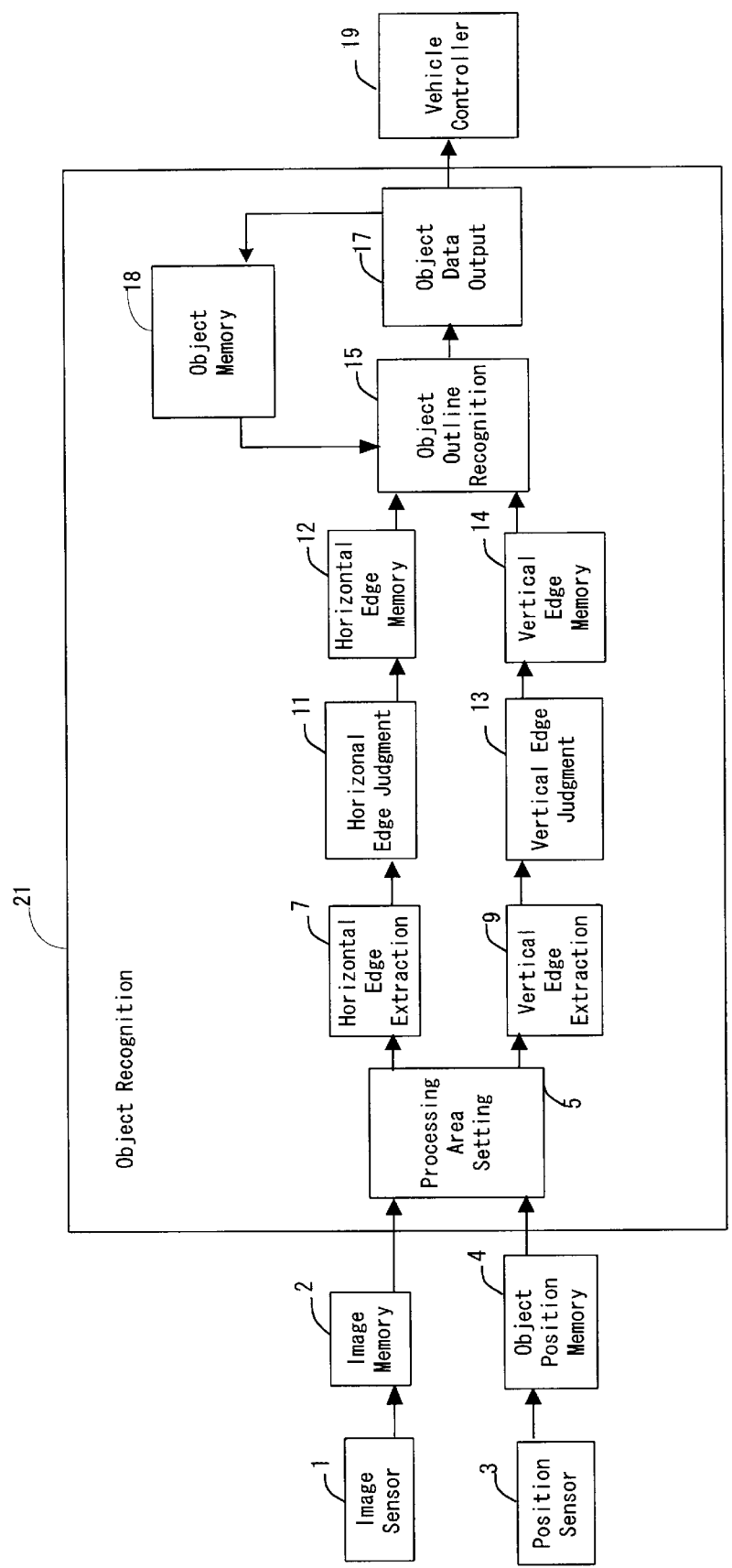
FIG. 1 is a block diagram illustrating the overall structure, and functional blocks of the controller of one embodiment of the present invention.

The embodiments of the present invention will be described below with reference to the attached drawings. FIG. 1 is an overall block diagram of an object recognition system in accordance with one embodiment of the present invention. Other than the image sensor 1 and the object position sensor 3, all the blocks in FIG. 1 may be incorporated in a controller which comprises a single chip or multiple chip semiconductor integrated circuit. Thus, FIG. 1 shows functional blocks of the controller. Respective functions of the blocks are performed by executing respective programs stored in the ROM of the controller.

In the present embodiment discussed below, it is assumed that an object to be recognized by the object recognition system is a vehicle ahead that traveling ahead of the vehicle mounting the system of the invention.

The image sensor 1 shown in FIG. 1 captures a view ahead of the vehicle mounting the system of the invention. The image sensor 1 is typically two-dimensional CCDs, and can be two-dimensional photo-sensor arrays. When usage in the night is considered, an image sensor using infrared light is advisable. In this case, it is preferable to install infrared-transparent filters in front of a lens, and to design the system such that the object is illuminated at a predetermined period from an infrared light source. The image sensor senses the infrared light reflected from the object. The image captured by the image sensor 1 is converted into digital data by an analog-to-digital converter (not shown), and is stored in an image memory 2.

An object position sensor 3 is typically implemented by laser radar or millimeter-wave radar. The position sensor 3 radiates laser or millimeter-wave to the object and receives the signal reflected by the object to measure the distance from the vehicle mounting the system of the invention to the object as well as the relative direction of the object to the vehicle. The position sensor 3 may be a scan-type radar apparatus with a single beam for scanning over a certain angle range ahead of the vehicle mounting the system of the invention. Alternatively, the scan-type radar with a plurality of beams may also be used. The angle range covered by beams of the radar is set based on the range in which the object to be recognized can be captured by the image sensor 1. In this embodiment, since the object to be recognized is the vehicle ahead, the radar is set to cover at least the lane of the vehicle mounting the system of the invention. Alternatively, the direction of the beams of the radar may be changed as appropriate according to the position of the vehicle ahead obtained in a previous recognition cycle such that the beams are correctly radiated to the vehicle ahead. Thus, the distance D and the direction θ of the vehicle ahead are determined and then stored in an object position memory 4 shown in FIG. 1.

Figure 2:
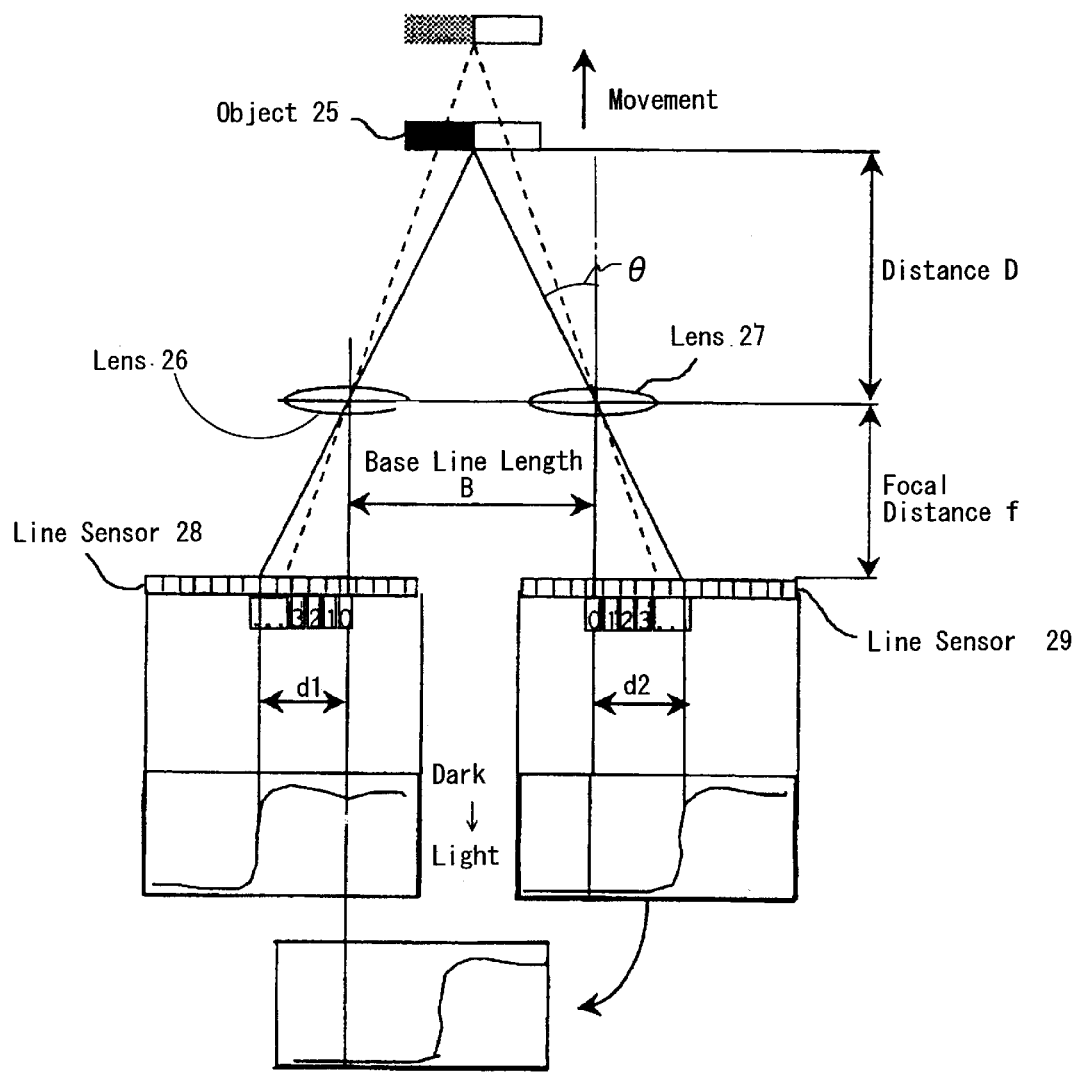
FIG. 2 is a diagram illustrating the principle of measurement by the triangulation method.

According to another embodiment, the position sensor 3 is implemented by using a pair of optical image sensors. By way of example, FIG. 2 shows the principle of measuring the distance by the triangulation method. For the sake of simplicity, the pair of image sensors shown in FIG. 2 are described as one-dimensional line sensors. A line sensor 28 and lens 26 constituting one of the pair of image sensors are arranged at a specified distance, i.e., at a distance equal to the base line length B in the horizontal direction from the line sensor 29 and lens 27 constituting the other of the pair.

The line sensors 28 and 29 are respectively positioned at the focal length f of the lenses 26 and 27. Assume that an image of an object 25 located at distance "D" from the plane of the lenses 26 and 27 is formed at a position shifted by a distance d1 from the optical axis of the lens 26 in the case of the line sensor 28, and is formed at a position shifted by a distance d2 from the optical axis of the lens 27 in the case of the line sensor 29. Then, according to the principle of triangulation, the distance "D" to the object 25 from the plane of the lenses 26 and 27 is determined by the equation:

$$D = B \cdot f / (d1 + d2).$$

In the embodiment, the images are digitized. Accordingly, the distance (d1+d2) is digitally calculated. The sum of the absolute values of the differences between the digital values indicating the intensities of the corresponding pixels of both images obtained from the line sensors 28 and 29 is determined while one or both of said images are shifted, and this sum is taken as a correlation value. The amount of shift of the images when this correlation value is at a minimum indicates the positional deviation between the two images, i.e., (d1+d2). In idealized terms, the distance by which the two images obtained from the line sensors 28 and 29 must be moved in order to cause said images to overlap as shown in FIG. 2 is (d1+d2). The direction θ of the object 25 to the vehicle mounting the system of the invention can be determined by the equation, tan θ=d2/f with respect to the optical axis of the lens 27.

In one embodiment, the captured image is divided into a plurality of windows and the above determination of the distance is carried out for each of windows. The determined distance is compared with a distance to the road that is calculated and stored beforehand for each window. If the determined distance is shorter than the distance to the road, the determined distance is judged to be the distance to the object. Thus, by determining the distances of the windows that correspond to the lane area of the vehicle mounting the system of the invention with a steering angle of the vehicle taken into account, the distance to the vehicle ahead can be calculated.

In another embodiment, the position sensor 3 is implemented by using the radar and the pair of image sensors in combination. By the way of example, in the situation in which it is difficult to determine the distance and the direction using the image captured by the pair of image sensors (for example, when the vehicle ahead is faraway from the vehicle mounting the system of the invention, or when the vehicle ahead is running through a tunnel and a view ahead of the vehicle cannot be stably captured), the radar is used to determine the distance and direction. On the other hand, using the radar to determine the distance and the direction limits the angle range of the vehicle mounting the system of the invention to a predetermined range. In other words, with the radar, it is difficult to cover a wide range that can be covered by the image sensors. Therefore, preferably, the direction of the beams of the radar is changed according to the direction of the vehicle ahead determined by the image sensors.

An object recognition part 21 shown in FIG. 1 sets a processing area within the image captured by the image sensor 1, and recognizes the vehicle ahead using edges extracted from the processing area. The process of recognizing the object is repeatedly executed at predetermined time intervals (for example, 100 milliseconds). Described below in detail is the method for recognizing the object implemented by the object recognition part 21.

Setting Processing Area

A processing area setting part 5 shown in FIG. 1 sets a processing area within the image captured and stored in the image memory 2 based on the position of the object stored in the object position memory 4 and a predetermined size for the object to be recognized. The predetermined size for the object to be recognized is set beforehand to surround the object to be recognized.

Figure 3:
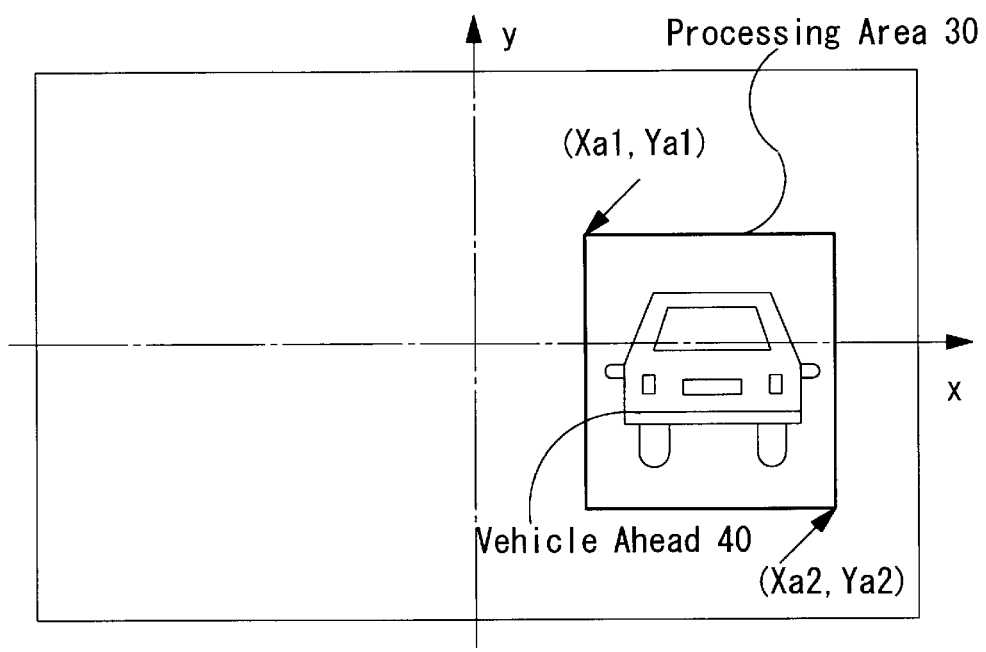
FIG. 3 is a diagram showing the processing area in accordance with one embodiment of the present invention.

The process of setting the processing area is described below by referring to FIGS. 3 and 4. FIG. 3 shows an example of the captured image in which the vehicle ahead 40 running forward is included. As shown in FIG. 3, an x-axis and a y-axis are fixed in the image, and a processing area 30 is defined by the coordinates (Xa1, Ya1) and (Xa2, Ya2).

Figure 4:
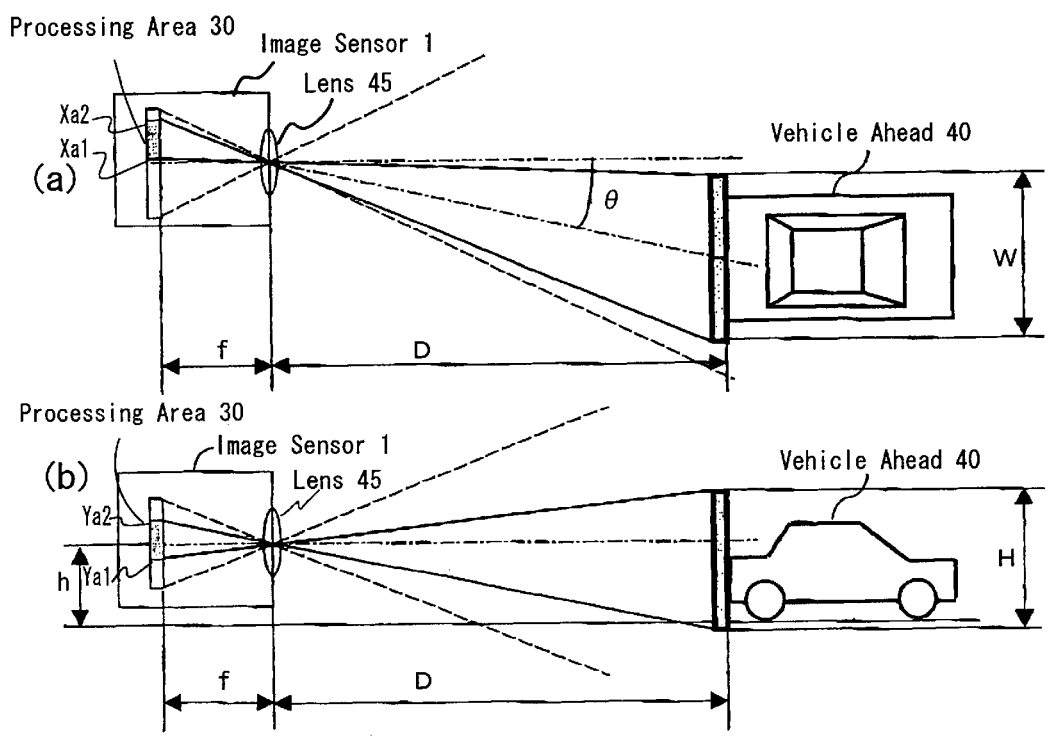
FIG. 4 is a diagram showing the way for setting a processing area in accordance with one embodiment of the present invention.

FIG. 4 shows the way for setting the processing area 30. FIG. 4(A) shows the way for determining the x coordinates, that is, Xa1 and Xa2, and FIG. 4(B) shows the way for determining the y coordinates, that is, Ya1 and Ya2.

In FIG. 4, the image sensor 1 is mounted on the vehicle mounting the system of the invention. The image sensor 1 captures the vehicle ahead 40 that is traveling in front of the vehicle mounting the system of the invention. Reference character f denotes the focal length of the lens 45 mounted on the image sensor 1, which is specified depending on the characteristic of the lens. Reference characters W and H denote predetermined width and height of the object to be recognized, that is, the vehicle ahead in the present embodiment, respectively. The width and height are preset to surround the object to be recognized. For example, for the vehicle ahead, W may be set to 2 m, and H may be set to 2.5 m. Reference characters D and θ denote the distance to the vehicle ahead and the relative direction of the vehicle ahead stored in the object position memory 4, respectively. Reference character h denotes the height from the road to the center of the lens 45, which is predefined depending on the position of the image sensor 1 in the vehicle mounting the system of the invention.

The processing area setting part 5 extracts D and θ stored in the object position memory 4 to compute the coordinates (Xa1, Ya1) and (Xa2, Ya2) using the predetermined parameters W, H, and h as follows.

$$Xa1=(D\times\tan\theta-(W/2))\times(f/D) \quad (1)$$

$$Xa2=(D\times\tan\theta+(W/2))\times(f/D) \quad (2)$$

$$Ya1=(H-h)\times(f/D) \quad (3)$$

$$Ya2=-(h\times(f/D)) \quad (4)$$

In one embodiment, for Ya1 and Ya2, a pitching allowance value "α" is used in consideration of pitching of the vehicle mounting the system of the invention, as follows.

$$Ya1=(H-h)\times(f/D)+\alpha \quad (5)$$

$$Ya2=(h\times(f/D)+\alpha) \quad (6)$$

Figure 5:
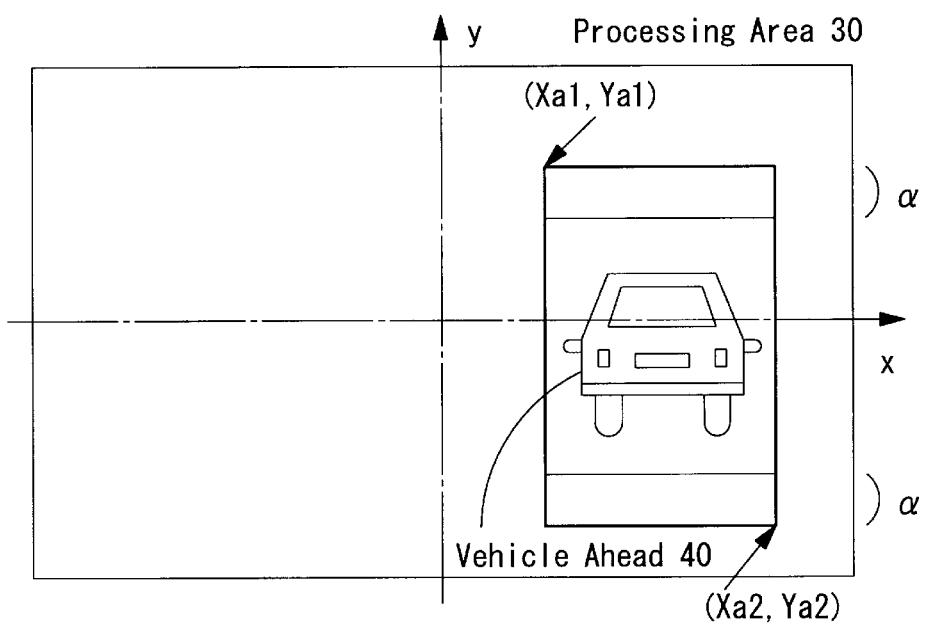
FIG. 5 is a diagram showing another processing area with allowance for pitching in accordance with one embodiment of the present invention.

Thus, the processing area 30 is defined within the captured image by the coordinates (Xa1, Ya1) and (Xa2, Ya2) as shown in FIG. 3, or is defined as shown in FIG. 5 with the pitching taken into account.

Extracting Horizontal and Vertical Edges

Figure 6:
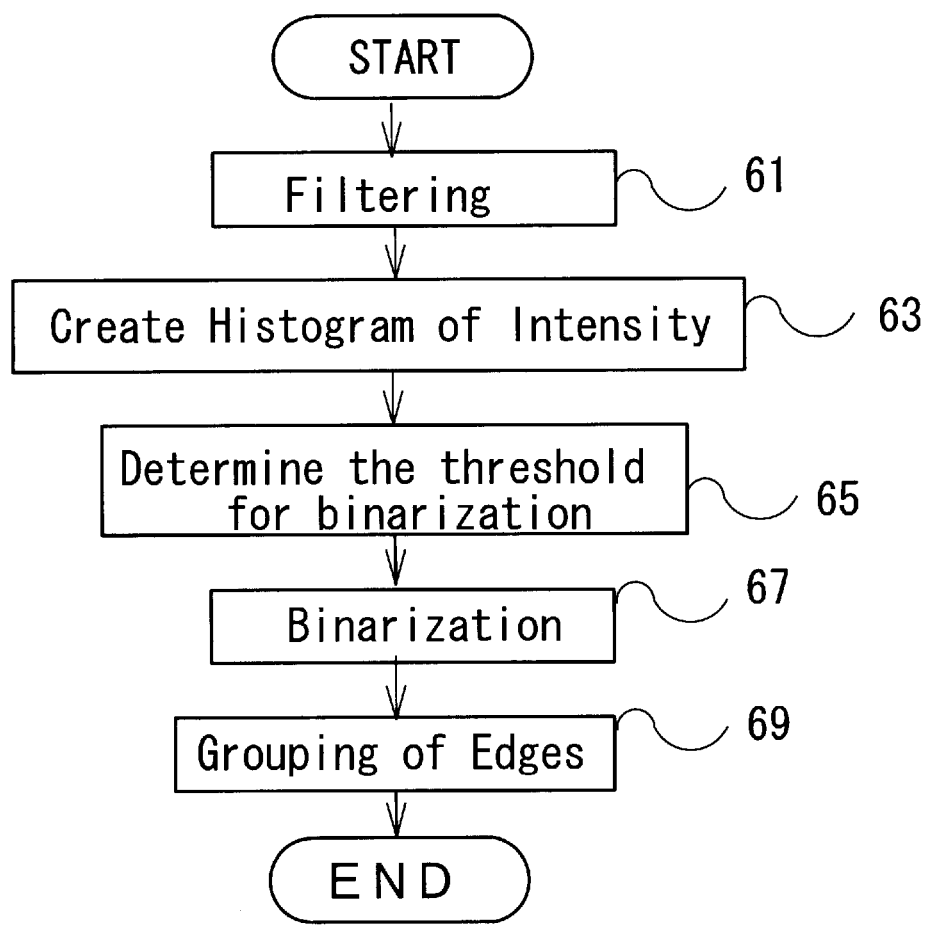
FIG. 6 is a flowchart of the method for extracting edges.

A horizontal edge extraction part 7 and a vertical edge extraction part 9 shown in FIG. 1 extract horizontal edges and vertical edges respectively from the processing area 30. Since both horizontal and vertical edges are extracted in the same way, only the process of extracting horizontal edges is described below. The extracted edges show a portion in which the variation of intensity is large in the image. FIG. 6 is a flowchart of extracting edges, which is carried out by the horizontal edge extraction part 7.

First, the horizontal edge extraction part 7 performs a filtering process on each pixel within the processing area 30 in the horizontal direction to enhance edge portions indicating a large difference in intensity in the horizontal direction (step 61). FIG. 7(A) shows an example of a horizontal edge filter. For convenience in the following computation, coordinates are assigned to each element of the filter as shown in FIG. 7(B).

A computation shown in the equation (7) is executed for the intensity value of each pixel within the processing area 30 while the processing area 30 is scanned by the horizontal edge filter.

$$P(x, y) = \sum_{i=-1}^{1} \sum_{j=-1}^{1} \{F(i, j) \times G(x+i, y+j)\} \quad (7)$$

In equation (7), x and y are coordinates identifying the position of each of pixels in the processing area 30. G(x, y)

indicates the intensity value of the pixel at (x, y), and F(i, j) indicates the value of the filter element at (i, j) of the horizontal edge filter. P(x, y) indicates the intensity value of the pixel at (x, y) after the filtering process has been performed. Since values of elements of the horizontal edge filter are predetermined such that horizontal edges are enhanced, horizontal edges can be detected by performing the above computation on each pixel.

In another embodiment, instead of the equation (7), the filtering process is carried out by differentiation. In this case, the difference in intensity between vertically adjacent pixels is calculated as shown in equation (8), where n is an integer, for example, may be set to 1 (n=1).

$$P(x, y)=G(x, y-n)-G(x, y+n) \tag{8}$$

Figure 8:
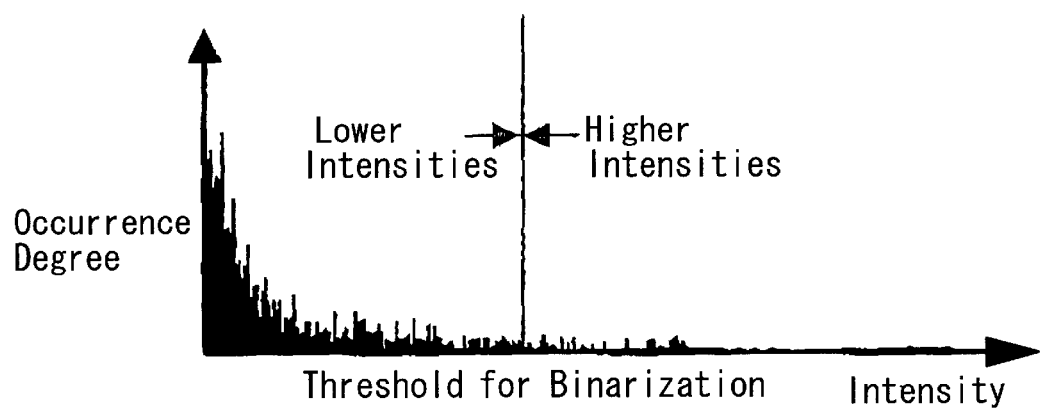
FIG. 8 is a histogram showing intensity values of the captured image.

Then, an intensity histogram is created based on the intensity value P of each pixel (step 63). The intensity value used in this embodiment is represented as digital data having 256 gradations (ranging from pure black "0" to pure white "255") FIG. 8 shows an example of the intensity histogram. The horizontal axis indicates the intensity values obtained by the filtering process while the vertical axis indicates the number of pixels corresponding to each of the intensity values.

On the basis of the histogram, the intensity value at which the ratio between the number of pixels in lower intensities and the number of pixels in higher intensities matches a predetermined value is determined as a threshold for binarization (step 65). Alternatively, the ratio between the number of the pixels forming edges of the vehicle ahead and the number of pixels of the processing area 30 may be estimated beforehand, and the intensity value that corresponds to the estimated ratio and that is greater than a predetermined intensity value may be determined as the threshold for binarization.

With respect to the threshold, for example, the higher intensities are assigned 1, the lower intensities are assigned 0, there by producing a binary image of the processing area 30 (step 67). The pixel having the value of 1 is referred to as an edge point.

There are a number of conventional methods for setting the threshold for binarization. The above method for setting the threshold is merely an example and is not meant to exclude another method.

Then, pixels having the value of 1, that is, edge points, are extracted. If two or more edge points continue, they are grouped into a horizontal edge. In the present embodiment, a labeling process using a template is used as a method for grouping edge points. The labeling process is described in detail in U.S. patent application Ser. No. 09/567,734 which is incorporated herein by reference.

With reference to FIG. 9, the labeling process is described below. FIG. 9 shows a template for the labeling process. T1 through T3 in FIG. 9(A) indicate positions in the template. V1 through V3 in FIG. 9(B) indicate the values (1 or 0) of pixels corresponding to the positions T1 through T3 respectively when the template is positioned such that T2 assumes the place of an edge point to be processed. L1 through L3 in FIG. 9(C) indicate labels assigned to pixels corresponding to the positions T1 through T3 respectively.

The table in FIG. 9(D) shows the type of label L2 that is assigned to the edge point at position T2 based on the value of the pixels at positions Ti through T3 when T2 is placed at the edge point to be processed. For example, if the values V1 through V3 at positions T1 through T3 satisfy condition 4 in FIG. 9(D), then a label L1 is assigned to the edge point at T2. The label L is assigned when the condition 1 is satisfied requiring a new label. A horizontal edge extraction part 7 successively scans the edge points placing T2 of the template at respective edge points, thus assigning label L2 to respective edge points, as shown in FIG. 9(E).

The process of assigning labels to respective edge points is described more specifically with reference to FIG. 10. FIG. 10(A) is an example of a part of the image after binarization, wherein the value of 0 is represented by a dot. The template is placed such that position T2 of the template is at respective edge points, which have the value of 1, to be processed. FIG. 10(B) shows the image after assigning labels to edge points. As seen in FIG. 10(B), the same labels are assigned to the continuous edge points.

Here, referring to FIG. 9(D) again, when condition 5 is satisfied, labels corresponding to positions T1 and T3 are connected or joined together, and the label corresponding to T3 is replaced with the label corresponding to T1. In the example shown in FIG. 10(B), edge points 91 and 92, and edge points 92 and 93 satisfy condition 5. Therefore, all edge points having the labels D and E are re-assigned label C (see FIG. 10(C)). By connecting labels, all continuous edge points are integrated into an edge group assigned the same labels. FIG. 10(C) shows three edge groups with labels A, B and C. Thus, three horizontal edges are extracted.

In another embodiment, the process of connecting labels is performed after scanning all edge points in the processing area 30 and assigning labels to them.

The vertical edge extraction part 9 extracts vertical edges from the processing area 30 in the same way as the horizontal edge extraction part 7 except that a vertical edge filter shown in FIG. 11 is used in step 61 (FIG. 6).

Judging Horizontal and Vertical Edges

Referring to FIG. 1, a horizontal edge judgment part 11 judges whether or not each of horizontal edges extracted by the horizontal edge extraction part 7 indicates or belongs to the object based on characteristics of the object to be recognized. In other words, each of the extracted edges is judged based on characteristics of the object when it is displayed in the image. In the present embodiment, since the object to be recognized is the vehicle ahead, the judgment is carried out based on characteristics, such as having a box-shape, having relatively a large number of horizontal edges, and having linear edges.

By way of example, the following judgment conditions are used to judge whether or not each of the extracted horizontal edges belongs to the vehicle ahead.

1) It is judged that an edge containing a pixel located on a boundary of the processing area belongs to an object other than the vehicle ahead. This is because the processing area is set to surround the vehicle ahead as described above.

2) The linearity of each of the extracted horizontal edges is examined, and it is judged that an edge having a poor linearity belongs to an object other than the vehicle ahead. This is because a horizontal edge belonging to the vehicle ahead does not draw a curve in the horizontal direction.

3) The slope of each of the extracted horizontal edges is examined, and it is judged that an edge having a large slope belongs to an object other than the vehicle ahead. This is because a horizontal edge belonging to the vehicle ahead does not have a large slope in the horizontal direction.

With reference to FIG. 12, the above condition 1) through 3) will be described in detail below. FIG. 12(A) shows an example of the captured image. A marking on the road 120, a mountain ridge 130, and white lines 140 are included in the image. The marking 120 extends across the processing area 30. FIG. 12(B) shows a binary image of horizontal edges extracted for the image in FIG. 12(A). In this binary image, not only the edges belonging to the vehicle ahead 40, but also edges 125 and 126 belonging to the marking 120, edges 135 through 137 belonging to a part of the mountain ridge 130, and edges 145 and 146 belonging to the white lines 140 are included.

For the above condition 1), the horizontal edge judgment part 11 examines x coordinates of the pixels forming each of the horizontal edges to judge whether the x coordinates include the edge point having Xa1 or Xa2. The processing area 30 is specified by the coordinates (Xa1, Ya1) and (Xa2, Ya2) as described above. Therefore, if the x coordinates include the edge point having Xa1 or Xa2, then it is judged that the horizontal edge extends across a boundary of the processing area 30, and that the horizontal edge belongs to an object other than the vehicle ahead. In the example shown in 12(B), since the edge 125 and 126 contain pixels having the x coordinates Xa1 and Xa2, each of the edges 125 and 126 is judged to belong to an object other than the vehicle ahead.

For the above condition 2), the horizontal edge judgment part 11 calculates a variance of y coordinates of the edge points forming each of the extracted horizontal edges. If the variance is larger than a predetermined value, then the horizontal edge is judged to belong to an object other than the vehicle ahead. In the example shown in FIG. 12(B), each of the edges 135 through 137 having poor linearity is judged to belong to an object other than the vehicle ahead.

For the above condition 3), the horizontal edge judgment part 11 approximates each of the extracted horizontal edges by straight lines in accordance with a conventional manner such as the least-squares method, to examine the slope of the edge approximated by the straight lines. If the slope is larger than a predetermined value, the horizontal edge is judged to belong to an object other than the vehicle ahead. In the example in FIG. 12(B), each of the edges 145 and 146 having a large slope is judged to belong to an object other than the vehicle ahead.

Horizontal edges judged to belong to the vehicle ahead and horizontal edges judged to belong to an object other than the vehicle ahead are stored separately in a horizontal edge memory 12. For example, the edge points forming the horizontal edges judged to belong to the vehicle ahead are stored with value 1, and the edge points forming the horizontal edge judged to belong to an object other than the vehicle ahead are stored with value zero. Alternatively, a flag may be set only for the edge points forming the horizontal edges judged to belong to an object other than the vehicle ahead, and these edge points are stored with the flag so that the edges cannot be used in subsequent processes. FIG. 12(C) shows a binary image of horizontal edges after removing the edges 125, 126, 135, 136, 137, 145, and 146.

Horizontal edges containing a pixel on a boundary of the processing area may originate from a building in the background and a marking on the road such as a stop line. Horizontal edges having a poor linearity may originate from natural objects such as a tree, and a flag used as a signboard of a shop. Horizontal edges having a large slope may originate from a guardrail, a sign of no-passing lane, and a roadside structure. According to the above process, erroneous recognition of the vehicle ahead can be avoided by judging horizontal edges based on the characteristics of the vehicle ahead.

One or more of the judgment conditions of 1) through 3) as above can be used. Furthermore, another judgment condition can be used. The characteristics can be changed depending on the type of an object to be recognized, such as the size, shape, and outline of the object.

A vertical edge judgment part 13 judges whether or not each of extracted vertical edges belongs to the vehicle ahead by the same way as the horizontal edge. Vertical edges judged to belong to the vehicle ahead and vertical edges judged to belong to an object other than the vehicle ahead are stored separately in a vertical edge memory 14.

Selecting Candidate Ends of the Object

Figure 14:
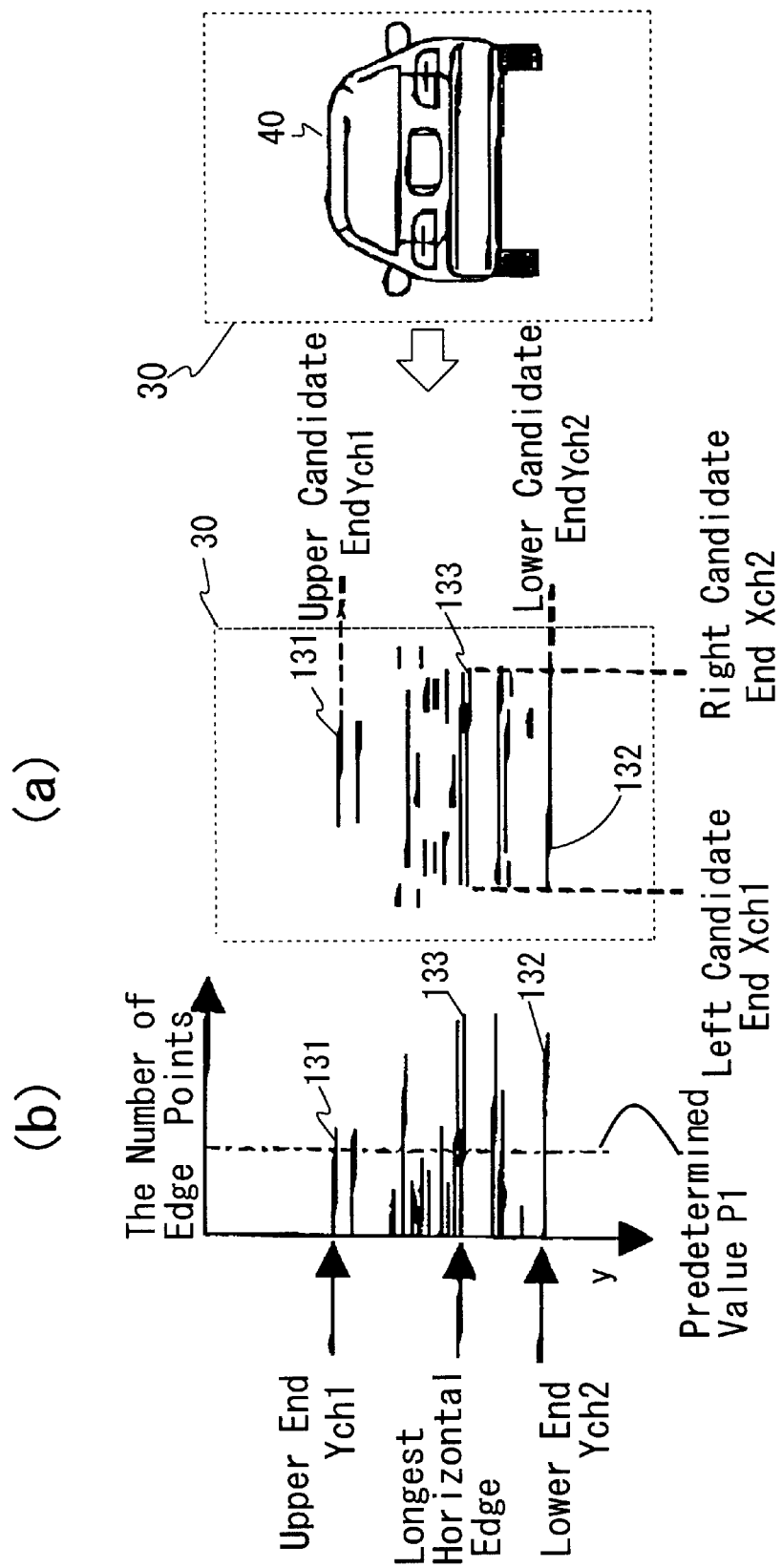
FIG. 14 is a diagram showing the scheme for selecting candidate ends of the object from horizontal edges in accordance with one embodiment of the present invention.
Figure 15:
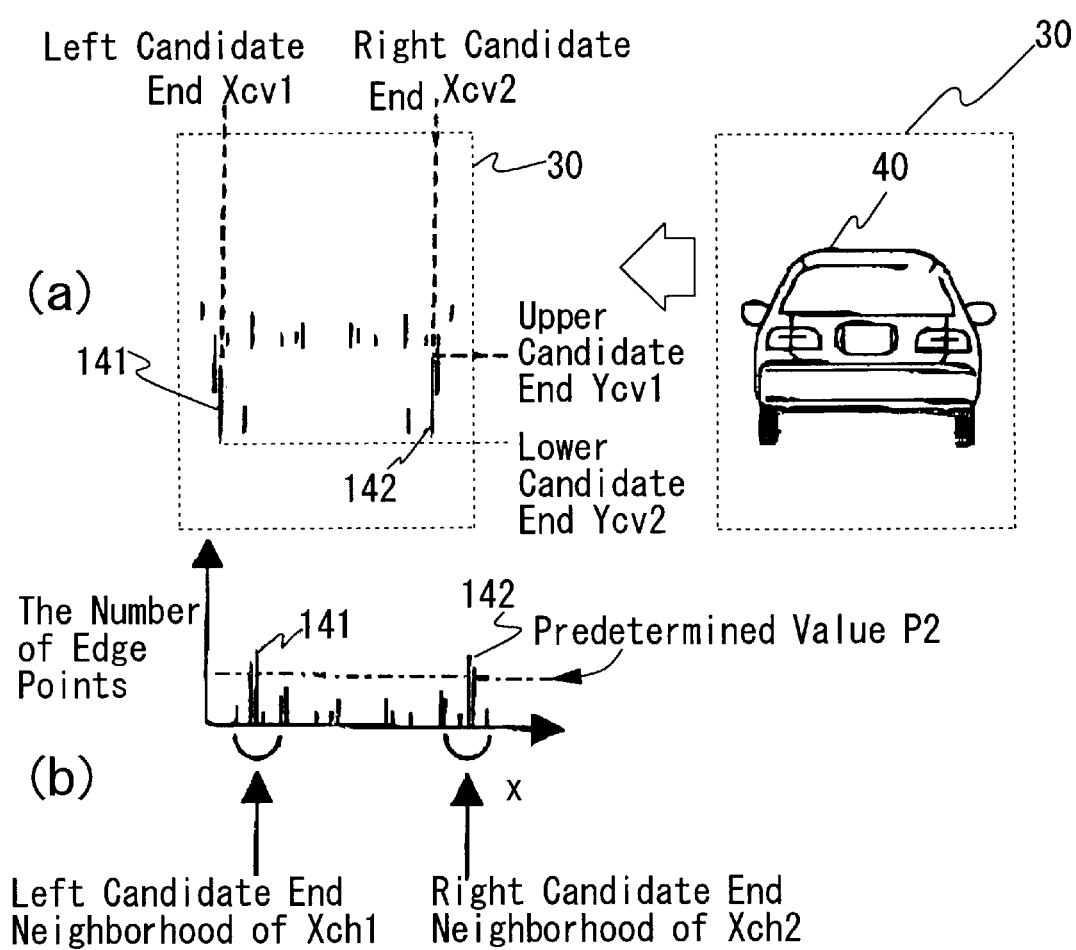
FIG. 15 is a diagram showing the scheme for selecting candidate ends of the object from vertical edges in accordance with one embodiment of the present invention.

Referring to FIG. 1 again, an object outline recognition part 15 recognizes the outline of the object based on edges judged to indicate or belong to the object and stored in the horizontal edge memory 12 and the vertical edge memory 14. According to the present embodiment, since an object to be recognized is the vehicle ahead, the object is displayed as a box-shape. Therefore, the outline of the object is recognized by determining the positions of the upper, lower, left, and right ends of the object. The process of recognizing the outline of the object will be described with reference to FIGS. 13 through 15.

Figure 13:
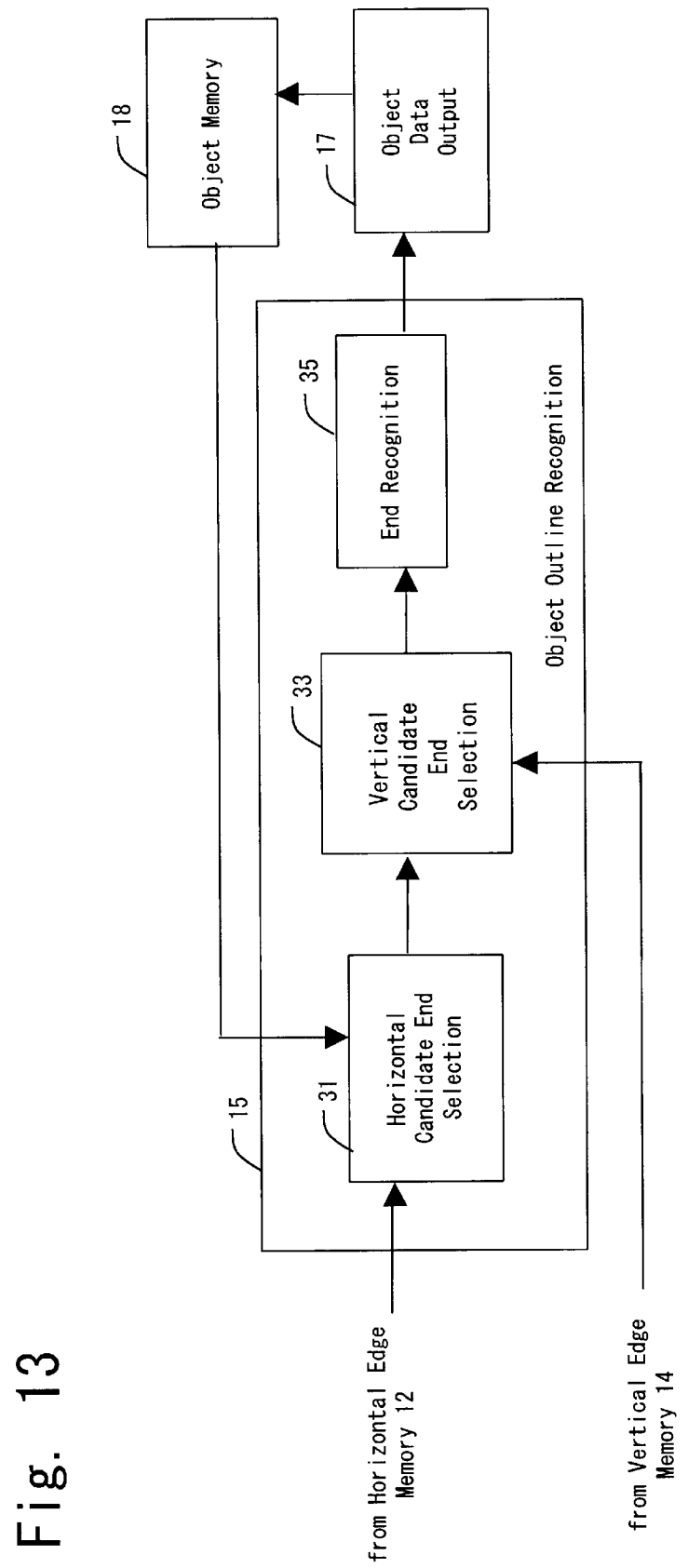
FIG. 13 is a block diagram,illustrating in detail the object outline recognition part in accordance with one embodiment of the present invention.

FIG. 13 is a detailed block diagram of the object outline recognition part 15. FIG. 14(A) shows a binary image showing the horizontal edges judged to belong to the vehicle ahead. FIG. 14(B) is a histogram corresponding to FIG. 14(A), and shows the number of the edge points forming the horizontal edge at each y coordinate in the processing area 30. A horizontal candidate end selection part 31 creates this histogram to identify two horizontal edges. One is the horizontal edge in which the number of edge points included is larger than a predetermined value P1, and which is closest to the upper boundary Ya1 of the processing area 30. The other is the horizontal edge in which the number of edge points included is larger than the predetermined value P1, and which is closest to the lower boundary Ya2 of the processing area 30. As a result, the horizontal edges 131 and 132 are identified. The y coordinate Ych1 corresponding to the upper horizontal edge 131 is defined as an upper candidate end while the y coordinate Ych2 corresponding to the lower horizontal edge 132 is defined as a lower candidate end. The predetermined value P1 is set depending on the width of the processing area 30 in the horizontal direction, and the width of the object to be recognized in the horizontal direction.

Then, the horizontal candidate end selection part 31 also identifies a horizontal edge which exists between the upper and lower candidate ends Ych1 and Ych2, and which best represents the characteristic of the vehicle ahead. In this embodiment, a horizontal edge in which the number of the edge points included is larger than the predetermined value Pi, and which contains the largest number of edge points (that is, the longest horizontal edge) is identified. This is because it best represents the positions of the left and right ends of the vehicle ahead which has a box-shape in the image. As a result, the horizontal edge 133 is identified. The x coordinate Xch1 corresponding to the left end of the horizontal edge 133 is defined as a left candidate end while the x coordinate Xch2 corresponding to the right end of the horizontal edge 133 is defined as aright candidate end. Thus, the upper, lower, left, and right candidate ends are selected from the horizontal edges only.

In another embodiment, the predetermined value used for identifying the upper and lower horizontal edges and the predetermined value used for identifying the longest horizontal edge may be set different values. Furthermore, the left and right candidate ends may be also selected from the identified upper or lower horizontal edges.

If horizontal edges for selecting the left and right candidate ends cannot be identified (for example, when the longest horizontal edge cannot be identified because one or both of the upper and lower candidate ends cannot be selected), then the horizontal candidate end selection part 31 can estimate the upper, lower, left, and right candidate ends in the current cycle based on the positions of the upper, lower, left, and right ends of the vehicle ahead recognized in a previous cycle (the object recognition process of the invention is performed at predetermined time intervals as described above). The estimated upper, lower, left, and right candidate ends pY1, pY2, pX1, and pX2 are used in lieu of the upper, lower, left, and right candidate ends selected from the horizontal edges respectively, as shown in the following equations.

$$Ych1 = pY1$$
$$Ych2 = pY2$$
$$Xch1 = pX1$$
$$Xch2 = pX2$$

In one embodiment, these estimated values are corrected according to behavior values (for example, the position of the steering angle and/or yaw rate of the vehicle mounting the system of the invention) obtained by means for detecting the behavior of the vehicle. Furthermore, the estimated values may be calculated based on the positions of the vehicle ahead stored in time series in an object memory 18 as results of a plurality of previous recognition cycles.

In another embodiment, if the horizontal candidate end selection part 31 can select the upper and lower candidate ends from the identified horizontal edges, but cannot select the left and right candidate ends (for example, when the longest horizontal edge cannot be selected because its length is less than a second predetermined value that is larger than a first predetermined value, provided that the first predetermined value is used to identify the upper and lower horizontal edges and the second predetermined value is used to identify the longest horizontal edge), then the upper and lower candidate ends are selected from the horizontal edges, and the left and right candidate ends are determined by the estimated left and right candidate ends pX1 and pX2 respectively.

FIG. 15(A) shows a binary image showing the vertical edges judged to belong to the vehicle ahead. FIG. 15(B) is a histogram corresponding to FIG. 15(A), and shows the number of the edge points forming the vertical edge at each x coordinate in the processing area 30. A vertical candidate end selection part 33 creates the histogram to identify two vertical edges. One is located near the left candidate end Xch1, and in which the number of the edge points included is larger than a predetermined value P2. The other is located near the right candidate end Xch2, and in which the number of the edge points included is larger than the predetermined value P2. This is because they best represent the positions of the left and right ends of the vehicle ahead. If a plurality of vertical edges are identified near the left candidate end Xch1, the longest vertical edge is chosen as the left vertical edge. Similarly, if a plurality of vertical edges are identified near the right candidate end Xch2, the longest vertical edge is chosen as the right vertical edge. As a result, the vertical edges 141 and 142 are identified. Since relatively a large number of horizontal edges are extracted when the object to be recognized is the vehicle ahead, it is preferable that vertical edges are identified based on the left and right candidate ends selected from the horizontal edges. Thus, the x coordinate Xcv1 corresponding to the left vertical edge 141 is defined as a left candidate end while the x coordinate Xcv2 corresponding to the right vertical edge 142 is defined as a right candidate end.

Then, the vertical candidate end selection part 33 selects one of the vertical edges 141 and 142 that has a higher y coordinate value for its upper end. In this example, the edge 142 is selected because the upper end of the edge 142 is located higher than the upper end of the edge 141. The y coordinate Ycv1 of the upper end of the vertical edge 142 is defined as an upper candidate end. The vertical candidate end selection part 33 also selects one of the vertical edges 141 and 142 that has a lower y coordinate value for its lower end. In this example, the vertical edge 141 is selected and they coordinate Ycv2 of the lower end of the edge 141 is defined as a lower candidate end. Defining the upper and lower candidate ends in such a way enables the size of the vehicle ahead to be emphasized in the vertical direction, thus the outline of the vehicle ahead being recognized with allowance.

Recognizing the Outline of the Object

Referring to FIG. 13 again, an end recognition part 35 determines the positions of the upper, lower, left, and right ends of the vehicle ahead based on Ych1, Ych2, Xch1, and Xch2 selected as candidate ends by the horizontal candidate end selection part 31 and Ycv1, Ycv2, Xcv1, and Xcv2 selected as candidate ends by the vertical candidate end selection part 33. The method for determining the positions of the ends of the vehicle ahead is described below with reference to the flowchart in FIG. 16.

If the vertical candidate end selection part 33 can select both left and right candidate ends, the left and right ends X1 and X2 of the vehicle ahead are determined by the selected left and right candidate ends Xcv1 and Xcv2 respectively (steps 161 and 162). Since the left and right candidate ends Xcv1 and Xcv2 have been selected based on the positions of the left and right candidate ends Xch1 and Xch2 selected from the horizontal edges, the outline of the vehicle ahead can be more correctly recognized.

As for the upper and lower ends of the vehicle ahead, the end recognition part 35 selects one of the upper candidate ends Ych1 and Ycv1 that is positioned higher in the image, and selects one of the lower candidate ends Ych2 and Ycv2 that is positioned lower in the image. Thus, the upper and lower ends Y1 and Y2 of the vehicle ahead are determined by the selected upper and lower candidate ends respectively (step 162). By emphasizing the vehicle ahead in the vertical direction, the outline of the vehicle ahead can be recognized with allowance.

In another embodiment, the end recognition part 35 selects one of the upper candidate ends Ych1 and Ycv1 that is closer to the upper candidate end pY1 estimated based on the positions of the vehicle ahead in a previous recognition cycle. The end recognition part 35 also selects one of the lower candidate ends Ych2 and Ycv2 that is closer to the estimated lower candidate end pY2 estimated based on the positions of the vehicle ahead in a previous recognition cycle. The upper and lower ends Y1 and Y2 of the vehicle ahead are determined by the selected upper and lower candidate ends respectively. The positions of the upper and lower ends of the vehicle ahead are correctly determined based on the previously recognized positions of the vehicle ahead, especially when the relative speed between the vehicle ahead and the vehicle mounting the system of the invention is substantially kept constant.

If the vertical candidate end selection part 33 cannot select the left candidate end, then the left end X1 of the vehicle ahead is determined by the left candidate end Xch1 selected from the horizontal edges, and the right end X2 of the vehicle ahead is determined by the right candidate end Xcv2 selected from the vertical edges (steps 163 and 164). The upper and lower ends Y1 and Y2 of the vehicle ahead are determined in the same way as step 162.

With reference to FIG. 17, the case in which the left candidate end Xcv1 cannot be selected from the vertical edges will be described in detail. FIG. 17(A) shows an example of the image in which the vehicle ahead 40 is included in the processing area 30. FIG. 17(B) shows the upper, lower, left, and right candidate ends Ych1, Ych2, Xch1, and Xch2 selected from the horizontal edges. FIG. 17(C) shows the upper, lower, and right candidate ends Ycv1, Ycv2, and Xcv2 selected from the vertical edges. As shown in FIG. 17(C), the left candidate end Xcv1 is not selected because a vertical edge for selecting the left candidate end Xcv1 cannot be identified near the left candidate end Xch1. FIG. 17(D) shows that the end recognition part 35 has determined the left end of the vehicle ahead by the left candidate end Xch1 selected from the horizontal edges. Thus, the outline 100 of the vehicle ahead 40 has been recognized.

Referring to FIG. 16 again, if the vertical candidate end selection part 33 cannot select the right candidate end, then the end recognition part 35 determines the right end X2 of the vehicle ahead by the right candidate end Xch2 selected from the horizontal edges, and determines the left end X1 of the vehicle ahead by the left candidate end Xcv1 selected from the vertical edges (steps 165 and 166). The upper and lower ends Y1 and Y2 of the vehicle ahead are determined in the same way as step 162.

If the vertical edge candidate end selection part 33 can select none of the left and right candidate ends, and if the horizontal candidate end selection part 31 can select the upper, lower, left, and right candidate ends, then the upper, lower, left, and right ends Y1, Y2, X1, and X2 of the vehicle ahead are determined by the upper, lower, left, and right candidate ends Ych1, Ych2, Xch1, and Xch2 selected from the horizontal edges (steps 167 and 168). Since the vertical candidate end selection part 33 has not selected any candidate ends, the positions of the upper, lower, left, and right ends of the vehicle ahead are determined by the upper, lower, left, and right candidate ends selected from the horizontal edges only. Thus, the outline of the object can be recognized based on the horizontal edges only.

With reference to FIG. 18, the case in which no vertical candidate end is selected will be described in detail. FIG. 18(A) shows an example of the image in which the vehicle ahead 40 is included in the processing area 30. FIG. 18(B) shows the upper, lower, left, and right candidate ends selected from the horizontal edges. FIG. 18(C) shows no candidate end because the any vertical edges for selecting the upper, lower, left and right candidate ends cannot be identified. FIG. 18(D) shows that the end recognition part 35 has determined the upper, lower, left, and right ends Y1, Y2, X1, and X2 of the vehicle ahead by the upper, lower, left, and right candidate ends Ych1, Ych2, Xch1, and Xch2 selected from the horizontal edges. Thus, the outline 100 of the vehicle ahead 40 has been recognized. Since the object to be recognized is the vehicle ahead, comparatively a large number of horizontal edges are extracted, thus the outline of the vehicle ahead being recognized from horizontal edges only.

In one embodiment, in step 168, if either one or both of the left and right candidate ends cannot be selected from the horizontal edges, the candidate ends estimated based on the position of the vehicle ahead recognized in a previous recognition cycle are used in lieu of the candidate ends selected from the horizontal edges, as described above. In this case, not only the left and right candidate ends but also the upper and lower candidate ends can be set according to the estimated candidate ends.

Finally, if the vertical candidate end selection part 33 can select none of the left and right candidate ends, and the horizontal candidate end selection part 31 can select none of the upper, lower, left and right candidate ends, the end recognition part 35 judges that there is no vehicle ahead (step 169).

Thus, although either one or both of the left and right candidate ends cannot be selected from the vertical edges, the outline of the object is recognized by the upper, lower, left, and right candidate ends selected from the horizontal edges. In addition, although either one or both of the left and right candidate ends cannot be selected from the horizontal edges, the upper, lower, left, and right candidate ends can be estimated based on the position of the object recognized in a previous recognition cycle. Therefore, the outline of the object can be recognized at a higher probability. As a result, recognition error due to the absence of desired candidate ends can be avoided.

Referring to FIG. 1 again, an object data output part 17 receives the outline data of the vehicle ahead, which includes the positions of the upper, lower, left and right ends of the vehicle ahead, recognized by the object outline recognition part 15, and outputs it to a vehicle controller 19. The object data output part 17 also stores the outline data in the object memory 18. The stored outline data is used by the horizontal candidate end selection part 31 as described above when candidate ends are estimated according to the position of the object recognized in a previous recognition cycle.

The vehicle controller 19 controls the operation of the vehicle mounting the system of the invention according to the outline data. For example, it may control the vehicle such that an appropriate distance is kept from the vehicle ahead. The controller 19 may alert a driver with a voice message, a warning lamp, or a warning beep, or may control the engine of the vehicle to forcibly decelerate the vehicle when the distance to the vehicle ahead is shorter than a predetermined value.

Each of the processing area setting part 5, the horizontal edge extraction part 7, the vertical edge extraction part 9, the horizontal edge judgment part 11, the vertical edge judgment part 13, the horizontal edge memory 12, the vertical edge memory 14, the object outline recognition part 15, the object data output part 17, the object memory 18 and the vehicle controller 19 shown in FIG. 1 can be implemented by a micro-controller which typically includes a central processing part (CPU), a read-only memory storing control programs and data, and a random-access memory (RAM) providing a working area for the CPU and temporary storage for various data. In other words, computer programs stored in the ROM implements the above-described functions of the functional blocks shown in FIG. 1.

The image memory 2, the object position memory 4, the horizontal edge memory 12, the vertical edge memory 14, and the object memory 18 may also be implemented using different memory areas of a single RAM. Temporary storage areas for data required in various types of operations may also be provided by portions of the same RAM.

The object recognition system according to the present invention maybe LAN-connected to an engine electronic control part (ECU), brake-control part and other ECU, and the output from this object recognition system may be used for overall control of the vehicle.

Thus, according to the invention, the outline of the object is recognized based on the horizontal and vertical edges. However, this recognition can be implemented using the horizontal edges only. In addition, even if desired horizontal edges are not obtained, the outline of the object can be recognized. As a result, recognition error that no object exists even if there is actually an object can be avoided.

Thus although particular embodiments of the invention have been described in detail, it should be appreciated that the alternatives specifically mentioned above and many other modifications, variations, and adaptations may be made without departing from the scope of the invention as defined in the claims.

What is claimed is:

1. An object recognition system comprising:
   a position sensor for determining a position of an object;
   an image sensor for capturing an image of the object; and
   a controller programmed to:
   set a processing area within the image captured by the image sensor based on the position of the object determined by the position sensor and a predetermined size for the object to be recognized,
   extract horizontal edges vertical edges from the processing area,
   identify horizontal edges vertical edges belonging to an outline of the object from the extracted horizontal edges and vertical edges;
   select left and right candidate ends from the identified horizontal edges;
   select left and right candidate ends from the identified vertical edges;
   determine left and right ends of the object based on the left and right candidate ends selected from the horizontal edges and the left and right candidate ends selected from the vertical edges; and
   recognize the outline of the object according to the determined left and right ends,
   wherein the left and right candidate ends selected from the vertical edges are chosen as the left and right ends of the object respectively; and
   wherein if said controller cannot select either one or both of the left and right candidate ends from the vertical edges, then the left or right end of the object is determined by the left or right candidate end selected from the horizontal edges in lieu of the left or right candidate end selection from the vertical edges.

2. The system of claim 1, said controller is programmed to select upper and lower candidate ends from the identified horizontal edges, and to select upper and lower candidate ends from the identified vertical edges; and
   wherein upper and lower ends of the object are determined based on the upper and lower candidate ends selected from the horizontal edges and the upper and lower candidate ends selcted from the vertical edges.

3. The system of claim 2, wherein the higher one of the upper candidate end selected from the horizontal edges and the upper candidate end selected from the vertical edges is chosen as the upper end of the object, and the lower one of the lower candidate end selected from the horizontal edges and the lower candidate end selected from the vertical edges is chosen as the lower end of the object.

4. The system of claim 1, if said controller cannot select either one or both of the left and right candidate ends from the horizontal edges, then the left and right ends of the object are determined by estimated left and right candidate ends in lieu of the left and right candidate ends selected from the horizontal edges, the estimated left and right candidate ends being determined based on the position of the object recognized in a previous recognition cycle.

5. The system of claim 1, wherein the predetermined size for the object to be recognized is defined to surround the object.

6. A method for recognizing an object comprising the steps of:
   determining a position of the object;
   capturing an image of the object;
   setting a processing area within the image based on the determined position of the object and a predetermined size for the object to be recognized;
   extracting horizontal edges vertical edges from the processing area;
   judging whether each of the extracted horizontal edges vertical edges belongs to the object based on characteristics of the object to be recognized;
   identifying horizontal edges vertical edges belonging to an outline of the object from the horizontal edges vertical edges judged to belong to the object;
   selecting left and right candidate ends from the identified horizontal edges;
   selecting left and right candidate ends from the identified vertical edges;
   determining left and right ends of the object based on the left and right candidate ends selected from the horizontal edges and the left and right candidate ends selected from the vertical edges; and
   recognizing the outline of the object according to the determined left and right ends,
   wherein the left and right candidate ends selected from the vertical edges are chosen as the left and right ends of the object respectively; and
   wherein if either one or both of the left and right candidate ends cannot be selected from the vertical edges, then the left or right end of the object is determined by the left or right candidate end selected from the horizontal edges in lieu of the left or right candidate end selected from the vertical edges.

7. The method of claim 6, further comprising:
   selecting upper and lower candidate ends from the identified horizontal edges;
   selecting upper and lower candidate ends from the identified vertical edges; and
   determining upper and lower ends of the object based on the upper and lower candidate ends selected from the horizontal edges and the upper and lower candidate ends selected from the vertical edges;
   wherein the outline of the object is recognized by the determined upper, lower, left, and right ends.

8. The method of claim 6, further comprising a step of determining estimated left and right candidate ends based on the position of the object recognized in a previous recognition cycle; and wherein if either one or both of the left and right candidate ends cannot be selected from the horizontal edges, then the left and right ends of the object are determined by the estimated left and right candidate ends in lieu of the left and right candidate ends selected from the horizontal edges.

9. An object recognition system comprising:

a position sensor for determining a position of an object;

an image sensor for capturing an image of the object;

means for setting a processing area within the image captured by the image sensor based on the position of the object determined by the positioning sensor and a predetermined size for the object to be recognized;

means for extracting horizontal edges vertical edges from the processing area;

means for judging whether each of the extracted horizontal edges vertical edges belongs to the object based on characteristics of the object to be recognized; and means for identifying horizontal edges vertical edges belonging to an outline of the object from the horizontal edges vertical edges judged to belong to the object;

means for selecting left and right candidate ends from the identified horizontal edges;

means for selecting left and right candidate ends from the identified vertical edges;

means for determining left and right ends of the object based on the left and right candidate ends selected from the horizontal edges and the left and right candidate ends selected from the vertical edges; and means for recognizing the outline of the object according to the and right ends, wherein the left and right candidate ends selected from the vertical edges chosen as the left and right ends of the object respectively; and wherein if either one or both of the left and right candidate ends cannot be selected from the vertical edges, then the left or right end of the object is determined by the left or right candidate end selected from the horizontal edges in lieu of the left or right candidate end selected from the vertical edges.

10. The system of claim 9, further comprising:

means for selecting upper and lower candidate ends from the identified horizontal edges; and means for selecting upper and lower candidate ends from the identified vertical edges;

wherein upper and lower ends of the object are determined based on the upper and lower candidate ends selected from the horizontal edges and the upper and lower candidate ends selected from the vertical edges; and wherein the outline of the object is recognized by the determined upper, lower, left, and right ends.

11. The system of claim 9, if either one or both of the left and right candidate ends cannot be selected from the horizontal edges, then the left and right ends of the object are determined by estimated left and right candidate ends in lieu of the left and right candidate ends selected from the horizontal edges, the estimated left and right candidate ends being determined based on the position of the object recognized in a previcous recognition cycle.

* * * * *

UNITED STATES PATENT AND TRADEMARK OFFICE
CERTIFICATE OF CORRECTION

PATENT NO. : 6,788,817 B1
DATED : September 7, 2004
INVENTOR(S) : Masakaz Saka et al.

It is certified that error appears in the above-identified patent and that said Letters Patent is hereby corrected as shown below:

Column 15,
Line 33, replace "extract horizontal edges vertical edges" with -- extract horizontal edges and vertical edges --.
Line 57, replace "candidate end selection from the vertical edges" with -- candidate end selected from the vertical edges --.

Column 16,
Line 25, replace "extracting horizontal edges vertical edges" with
-- extracting horizontal edges and vertical edges --.
Lines 27-28, replace "judging whether each of the extracted horizontal edges vertical edges" with -- judging whether each of the extracted horizontal edges and vertical edges --.
Lines 30-32, replace "identifying horizontal edges vertical edges belonging to an outline of the object from the horizontal edges vertical edges judged to belong to the object" with -- identifying horizontal edges and vertical edges belonging to an outline of the object from the horizontal edges and vertical edges judged to belong to the object --.

Column 17,
Line 15, replace "means for extracting horizontal edges vertical edges" with -- means for extracting horizontal edges and vertical edges --.
Lines 17-18, replace "means for judging whether each of the extracted horizontal edges vertical edges" with -- means for judging whether each of the extracted horizontal edges and vertical edges --.
Lines 20-22, replace "means for identifying horizontal edges vertical edges belonging to an outline of the object from the horizontal edges vertical edges judged to belong to the object" with -- means for identifying horizontal edges and vertical edges belonging to an outline of the object from the horizontal , edges and vertical edges judged to belong to the object --.
Line 33, replace "to the and right ends" with -- to the left and right ends --.

UNITED STATES PATENT AND TRADEMARK OFFICE
CERTIFICATE OF CORRECTION

PATENT NO. : 6,788,817 B1
DATED : September 7, 2004
INVENTOR(S) : Masakaz Saka et al.

It is certified that error appears in the above-identified patent and that said Letters Patent is hereby corrected as shown below:

<u>Column 18,</u>
Line 2, replace "vertical edges chosen as the left and right ends" with -- vertical edges are chosen as the left and right ends --.

Signed and Sealed this

Eighth Day of March, 2005

JON W. DUDAS
*Director of the United States Patent and Trademark Office*